(12) United States Patent
Roth et al.

(10) Patent No.: US 10,270,781 B2
(45) Date of Patent: Apr. 23, 2019

(54) TECHNIQUES FOR DATA SECURITY IN A MULTI-TENANT ENVIRONMENT

(71) Applicant: Amazon Technologies, Inc., Reno, NV (US)

(72) Inventors: Gregory B. Roth, Seattle, WA (US); Eric Jason Brandwine, Haymarket, VA (US); Graeme D. Baer, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/076,264

(22) Filed: Mar. 21, 2016

(65) Prior Publication Data

US 2016/0205110 A1    Jul. 14, 2016

Related U.S. Application Data

(62) Division of application No. 13/535,143, filed on Jun. 27, 2012, now Pat. No. 9,294,507.

(51) Int. Cl.
| | | |
|---|---|---|
| *H04L 29/06* | (2006.01) | |
| *G06F 21/31* | (2013.01) | |
| *G06F 21/60* | (2013.01) | |
| *G06F 9/455* | (2018.01) | |

(52) U.S. Cl.
CPC ............ *H04L 63/102* (2013.01); *G06F 9/455* (2013.01); *G06F 21/31* (2013.01); *G06F 21/606* (2013.01); *H04L 63/105* (2013.01); *H04L 63/20* (2013.01)

(58) Field of Classification Search
CPC .............................. H04L 63/20; H04L 63/102
See application file for complete search history.

(56) References Cited

U.S. PATENT DOCUMENTS

| | | | |
|---|---|---|---|
| 8,938,775 B1 | 1/2015 | Roth et al. | |
| 2003/0177374 A1* | 9/2003 | Yung | H04L 47/10 713/189 |
| 2004/0111639 A1* | 6/2004 | Schwartz | H04L 63/0245 726/1 |
| 2005/0060568 A1 | 3/2005 | Beresnevichiene et al. | |

(Continued)

OTHER PUBLICATIONS

U.S. Non-Final Office Action dated Apr. 17, 2014 issued in U.S. Appl. No. 13/535,139.

(Continued)

*Primary Examiner* — Dao Q Ho
(74) *Attorney, Agent, or Firm* — Hogan Lovells US LLP

(57) ABSTRACT

The usage of data in a multi-tenant environment can be controlled by utilizing functionality at the hypervisor level of various resources in the environment. Data can be associated with various tags, security levels, and/or compartments. The ability of resources or entities to access the data can depend at least in part upon whether the resources or entities are also associated with the tags, security levels, and/or compartments. Limitations on the usage of the data can be controlled by one or more policies associated with the tags, security levels, and/or compartments. A control service can monitor traffic to enforce the appropriate rules or policies, and in some cases can prevent encrypted traffic from passing beyond a specified egress point unless the encryption was performed by a trusted resource with the appropriate permissions.

20 Claims, 5 Drawing Sheets

(56) References Cited

U.S. PATENT DOCUMENTS

2009/0276204 A1 11/2009 Kumar et al.
2011/0277038 A1 11/2011 Sahita et al.
2012/0166818 A1 6/2012 Orsini et al.

OTHER PUBLICATIONS

U.S. Notice of Allowance dated Sep. 25, 2014 issued in U.S. Appl. No. 13/535,139.
U.S. Non-Final Office Action dated Jan. 6, 2014 issued in U.S. Appl. No. 13/535,143.
U.S. Final Office Action dated Jun. 27, 2014 issued in U.S. Appl. No. 13/535,143.
U.S. Non-Final Office Action dated Dec. 18, 2014 issued in U.S. Appl. No. 13/535,143.
U.S. Final Office Action dated May 20, 2015 issued in U.S. Appl. No. 13/535,143.
U.S. Notice of Allowance dated Dec. 3, 2015 issued in U.S. Appl. No. 13/535,143.

* cited by examiner

TECHNIQUES FOR DATA SECURITY IN A MULTI-TENANT ENVIRONMENT

CROSS-REFERENCES TO RELATED APPLICATIONS

This application is a divisional of allowed U.S. application Ser. No. 13/535,143, entitled "TECHNIQUES FOR DATA SECURITY IN A MULTI-TENANT ENVIRONMENT," filed Jun. 27, 2012; of which the full disclosure of this application is incorporated herein by reference for all purposes.

BACKGROUND

An ever-increasing amount of sensitive data and confidential information is being stored electronically, such on a disk drive of a client device, in a database hosted by a remote party, or in another such location. The amount of transmission of such data is increasing as well. Accordingly, there is a need to ensure that only authorized parties have access to the data. Various approaches have been used to attempt to prevent unauthorized access to data, such as through use of data encryption and secure communication channels. In many cases, these mechanisms are not flexible enough to enable users with multiple security permissions to concurrently access data with different security levels. Further, there is difficulty in controlling what a party does with secure information once that information is accessed. The difficulty can be increased in situations such as a multi-tenant environment, where multiple users might be provisioned on the same physical device or have access to the same database.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing access to, and use of, data by shared resources in a multi-tenant computing environment. In particular, various embodiments enable data loss prevention and data security mechanisms to be determined and enforced in various ways and locations in a multi-tenant environment, which can have multiple users sharing physical and/or virtual resources, and differing security levels or permissions for any of those users and/or resources. Further, data stored to the multi-tenant environment can be tagged with security information, and various components can monitor access and usage of that data, enabling alarms, blocking, or other such actions to be taken. The actions to be taken and way in which information should be protected can be enforced using any of a number of different rules or policies, applied at various levels, boundaries, or components of the environment. Further, there can be multiple levels of security in such an environment that can be enforced using similar mechanisms.

Various other applications, processes, and uses are presented below with respect to the various embodiments.

Figure 1:
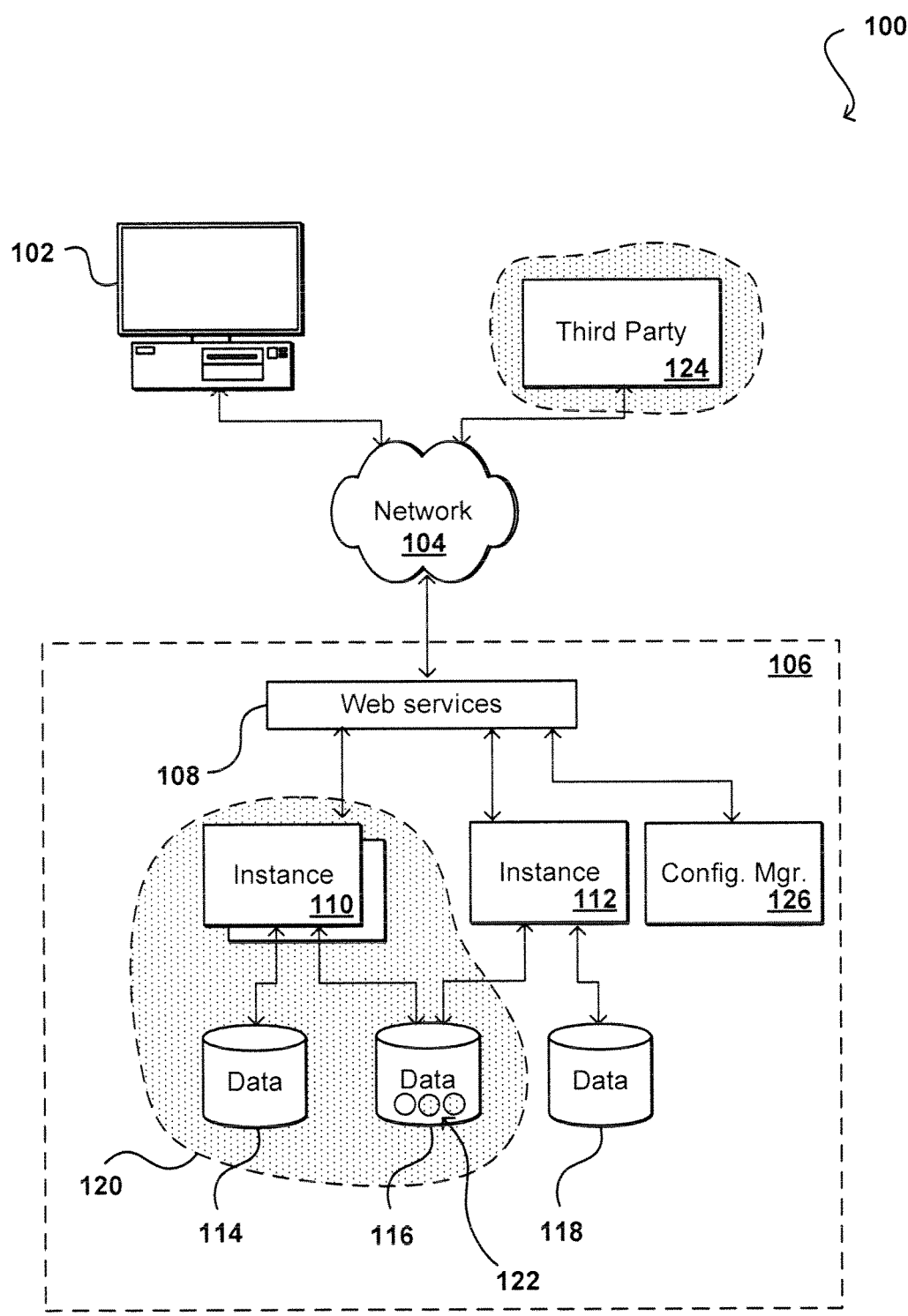
FIG. 1 illustrates a first example environment in which various embodiments can be implemented.

FIG. 1 illustrates an example environment 100 in which aspects of various embodiments can be implemented. In this example, a user or other such entity (e.g., an application) is able to utilize a client device 102 to access a multi-tenant environment 106 (e.g., a cloud computing environment or other set of shared resources operated by one or more resource providers) across at least one network 104 (e.g., the Internet or a cellular network, using a wired and/or wireless connection). A "resource" as used herein can refer to any appropriate component used to process, manage, transfer, or manipulate data in an electronic environment, as may include a computer, a data store, a virtual instance, a virtual machine, a network socket, an arbitrary network connection, and the like. The access can be obtained using, for example, a Web services request sent to an appropriate application programming interface (API) of a Web services layer 108, or other such interface. As known for such purposes, a Web services layer can include any of a number of components, such as Web servers, routing components, load balancers, and the like. In this example, the client device is able to communicate with one or more resources or resource instances 110, 112, which can be physical and/or virtual, and may be dedicated or shared among various users or applications. For example, the client device might utilize a computing instance to perform a computing operation on behalf of the client device, and might utilize a data instance to cause data to be written to, or read from, at least one data store. Various other uses and interactions can occur, and various other components can be utilized, as should be apparent to one of ordinary skill in the art in light of the teachings and suggestions contained herein.

In such an environment, a provider, user, or other entity might can attempt to implement one or more security mechanisms to prevent users, applications, or components from having access to certain types of data or functionality, and/or performing certain tasks with that data or functionality. For example, a conventional approach might utilize a data loss prevention mechanism (DLP) to identify and track confidential data in order to protect against unauthorized access. Such mechanisms often are implemented as a software and/or hardware solution at one or more network egress points near a perimeter of the environment. For example, a component of the Web services layer 108 might be configured to monitor traffic before the traffic exits the environment, in order to prevent an unauthorized transmission of the data that might violate one or more security policies. DLP can be enforced at such a boundary in order to enforce content rules, such as to block or audit certain types of data crossing the designated security boundary. For example, a DLP component can be configured to detect pieces of data such as social security numbers, credit card numbers, and other forms of sensitive data with a distinct format or other such aspect. There are deficiencies with conventional approaches to protecting such information, however. For example, DLP processes typically cannot inspect encrypted data. If a user or application obtains access to credit card numbers and transmits those numbers using an encrypted communication, a DLP process will not be able to match the format or portion of the numbers in the encrypted data. Further, the locations at which conventional DLP processes can be implemented are limited, which enables a user or application to perform various actions with the information, including manipulating the information, as long as the information is not transmitted out of the environment in its native form. Further still, even though processes can be implemented on a physical device to control or monitor data for that device, such an approach does not provide the flexibility needed for a multi-tenant environment where there can be multiple virtual instances on a single physical device, and where each of those instances can potentially correspond to a different entity with a different security level, policy, set of rules, etc. In some embodiments, a configuration manager 126 or other such entity can be utilized to specify, enforce, and/or update policies and various configuration parameters for the multi-tenant environment. The configuration manager can also manage the mechanisms that are used by the various resources in the environment for enforcing policies and/or data flow controls.

Approaches in accordance with various embodiments can provide at least some of this and other types of protection for virtualized resources by providing a data loss prevention-type service within the hypervisor or dom0 of a virtualized system. As known in the art, a hypervisor is a type of virtual machine manager that can enable hardware virtualization by allowing one or more guest operating systems to operate concurrently on a host device. A hypervisor can manage the execution of the guest operating systems, and can enable multiple instances of those operating systems to share virtualized hardware resource. Similarly, dom0, or domain zero, is typically the first domain started by a hypervisor during a boot procedure. The dom0 enables new domains to start, and can directly access the underlying hardware, device drivers, etc.

The implementation of such a service at the hypervisor or dom0 level of a virtualized system can provide several distinct advantages. For example, utilizing a secure socket layer (SSL)-enabled service (or other such encryption method) with a data loss prevention service at the hypervisor or dom0 provides the ability to block encrypted traffic and enable inspection of all outbound traffic while retaining the security benefits of end-to-end SSL. In some embodiments, encryption by a party other than the resource provider may not be allowed, ensuring that the provider (or an appropriate application, service, or component) can have an opportunity to inspect the data for certain types of information.

Such an approach also enables multiple classes of secure storage (e.g., secure "cloud" storage) to be enforced, ensuring that certain data or types of data are only accessible from computing resources that utilize the service, or are otherwise enabled with the data loss prevention functionality. Such an approach can prevent data stored to a shared resource in a multi-tenant environment, or stored "in the cloud," to be easily removed from the environment, but could allow for such data to be used for computation or other such purposes. For example, a statistical analysis can be executed on user data without allowing the actual user data to be extracted from the environment. In some embodiments, there also can be limits or policies specified to how the data can be used within the environment, and what type of information based on that data can be transmitted outside the environment.

Additional processing can be provided as well. For example, application-level firewalling or intrusion detection functionality can be provided through the DLP in the hypervisor. Further, correctly formed responses can be described to implement an egress filter where certain types of messages, or messages sent from certain senders, among other such options, can be blocked. Further, secure storage policies can be implemented such that entity can read across certain boundaries or levels, in at least one direction, but may be unable to write or transmit across those boundaries or levels. In some embodiments, a component such as a hypervisor or VPN adaptor can engage in key negotiation with other systems, services, or components within, or external to, the multi-tenant environment. Such negotiation can ensure that the system, service, or component will enforce data flow rules or policies for a transmission, other transmissions from a source, transmissions from a recipient, etc. In some embodiments, the transmission might only be allowed outside, or across, the multi-tenant environment if a trusted channel exists, and parties to the trusted channel have agreed to enforce the data flow rules. Various other functions can be implemented as well as discussed and suggested herein.

For example, in the environment of FIG. 1 there are multiple types of instances 110, 112 that are able to access multiple data stores 114, 116, 118. In at least some embodiments, customers (or other applications or entities) can be enabled to "tag" data relating to certain types of information, where the tag designate a level of security, type of access, or other such criterion that a user, application, component, or entity must have in order to perform certain operations with that data. For example, a region 120 of the provider environment 106 might be tagged with a tag such as "credit card" which means that any component within a virtual boundary of that an example process for 120 can access data tagged with a "credit card" or similar tag. For example, a first data store 114 might be tagged as a credit card data store, such that all data stored therein is inherently tagged as "credit card" data. It should be understood that data tagged with a credit card tag is not limited to credit card numbers, but can include data that might be stored with credit card information in at least some embodiments. Thus a provider or customer might cause an entire data store to be tagged with the credit card tag. Alternatively, only a portion of the data in a data store might be tagged as credit card data. For example, another data store 116 is contained within the boundary of the credit card region 120, and thus is permitted to store credit card data, but not all the data in the data store necessarily is tagged with a credit card tag. Portions of the data tagged with a credit card tag are illustrated as shaded objects 122 in the figure. Thus, an entity might have the ability to access a data store within the credit card region 120, but might not be able to access data 122 that is tagged with a credit card tag. For example, an instance 110 within the credit card region 120 might be granted permission to read any data in the first data store 114 that is tagged as a credit card data store, as well as any data in the second data store 116. An instance 112 outside the credit card region 120 might not be able to access the first data store 114 tagged with a credit card tag, but might be able to access at least that portion of the data in the second data store 116 that is not marked with a credit card tag. In this example, both instance types 110, 112 can read from a data store 118 outside the credit card region 120.

Instead of enforcing egress only at network boundaries, such as at the Web services layer 108, approaches discussed herein enable more flexible policies to be implemented to control how the data can be used. For example, an instance 110 with access to a data store 114 tagged with a security tag might be able to read and write to that data store 114, and perform any operations on that data within the tagged region 120, such as by using other tagged resources in the region. In some instances, the instance 110 might also be able to write that data, or information generated after obtaining that data, to a data store 116 within the tagged region 120, as long as the written data is also tagged appropriately. In at least some embodiments, the instance 110 is prevented from writing the data, or generated information, to a data store 118 that is outside the tagged region 120.

There also can be various restrictions on components or entities such as instances 112 outside the tagged region 120, which can be enforced using services in the hypervisor of the machine hosting a given instance or at any other appropriate location as discussed herein. In some embodiments, the instance might be able to see the either of the data stores 114, 116 in the tagged region 120, or might only be able to see the data store 116 that is not tagged, such that all data contained therein is not considered to be tagged data, but the store may contain some tagged data 122. In different embodiments, the instance 112 might be able to see the tagged data or might not be able to see the tagged data. In some embodiments, the instance might be able to access the tagged data, but not cause that data to be written to any components outside the tagged region 120. In some embodiments, the instance 112 might even be able to cause the tagged data from the data store 116 to be transmitted to a third party system 124 outside the environment that is authorized to receive tagged data, but where the instance 112 itself is not able to access the tagged data.

Similarly, an instance 110 inside the tagged region 120 might be able to write or cause tagged data to be transferred to an entity outside the tagged region 120 that is also authorized to receive tagged data. The instance 110 can be restricted from transmitting the data, or information generated using that data, to another instance 112 outside the region 120 that is not authorized to receive the data. Any time an entity such as the instance 110 attempts to transfer tagged data outside the tagged region 120, however, the SSL or other encryption service in the respective hypervisor or dom0 can be instructed to ensure that the data is encrypted before passing out of the tagged region. Various other polices or rules can be applied or enforced as well within the scope of the various embodiments.

When any of these policies or rules are violated, or a task would cause them to be violated, there can be any of a number of different actions taken. For example, the transmission of unencrypted, tagged data outside a tagged region can be blocked, or an alarm can be generated to notify a person or entity of the transmission. In some embodiments, information for the transmission can be logged or audited for subsequent analysis. In some embodiments, an access or security level of a user or component can be updated, or another such remedial action can be taken.

In some embodiments, there can be additional DLP modules or services positioned along various paths in the environment. These modules can be configured to recognize objects marked "do not egress," for example, to prevent the unauthorized transmission of data or an attempt to re-write this data without the necessary tags. Such modules can be placed at any location in the environment where such data can be accessed, stored, or transmitted. Further, the modules can recognize various patterns in the data, such that data can be blocked or otherwise managed even when the data is not tagged. Further still, the modules can block encrypted transmissions in some embodiments whenever those transmissions come from a tagged or protected region or source, for example, but were not encrypted by a tagged or otherwise authorized resource for the type of data, security level, etc.

Figure 2:
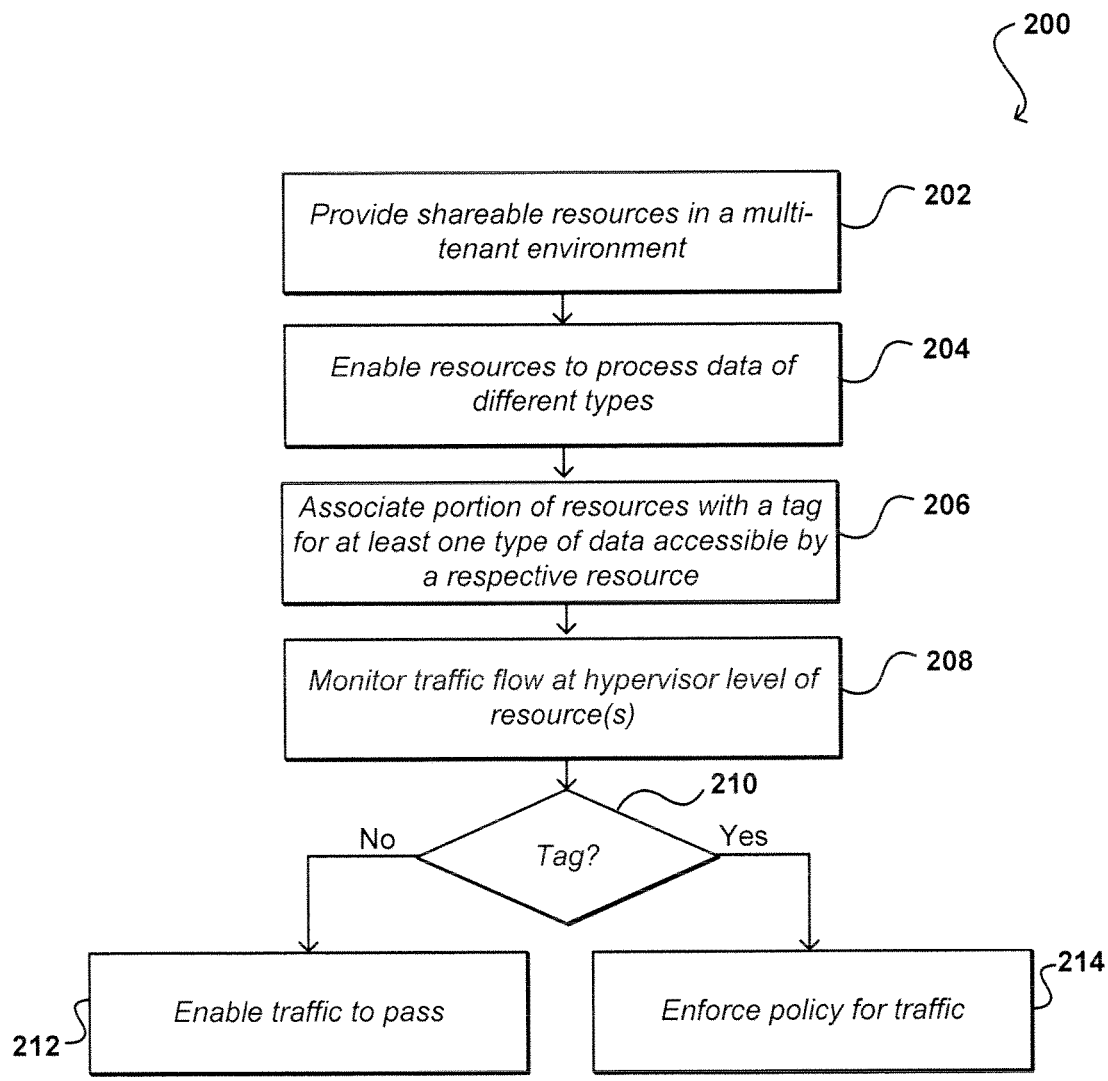
FIG. 2 illustrates an example process for preventing unauthorized egress of data in a multi-tenant environment that can be utilized in accordance with various embodiments.

FIG. 2 illustrates an example process 200 for preventing unauthorized egress of data in a multi-tenant environment that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a plurality of shareable resources is provided 202 in a multi-tenant environment. As discussed, these resources can include data stores, host machines, load balancers, and other such components, and at least some of the resources can concurrently host instances or partitions for one or more users. At least a portion of these resources can be enabled 204 to process data of various types. As used in this example, processing can refer to reading, writing, transmitting, or manipulating, among other such options. At least one of the data types can be associated with a tag, such that each data object of the data type has a copy of the tag indicating a data type of the object. At least a portion of the resources can be associated 206 with a tag for a specific data type, indicating that the resource is able to perform one or more types of processing with respect to data objects of a type associated with that tag. As discussed herein, a group of resources with a common tag can refer to a data boundary or other such grouping. One or more of the tagged resources can monitor 208 traffic passing through the resource using a monitoring module at a hypervisor, dom0, or similar level of the resource. If the traffic is determined 210 to not include a tag, or to not match a pattern associated with the data of the type associated with the tag, for example, the traffic can be allowed 212 to pass. If, however, a tag is detected in the traffic, at least one policy can be enforced 214 for the data type associated with that tag. As discussed, enforcing a policy can include actions such as blocking a message being sent to a resource without an appropriate tag, blocking a message being sent outside a respective data boundary, generating an alarm when the data is to be written to a data store not associated with the tag, or auditing the traffic, among other such options. A data boundary can also include, for example, a network boundary or a boundary of a network container, where a network container can include any appropriate component or set of components, such as may include one or more subnets in an internal network, one or more hosts (physical or virtual), a VLAN, a network reachable by a particular route or VPN, or an overlay network, among other such options.

Figure 3:
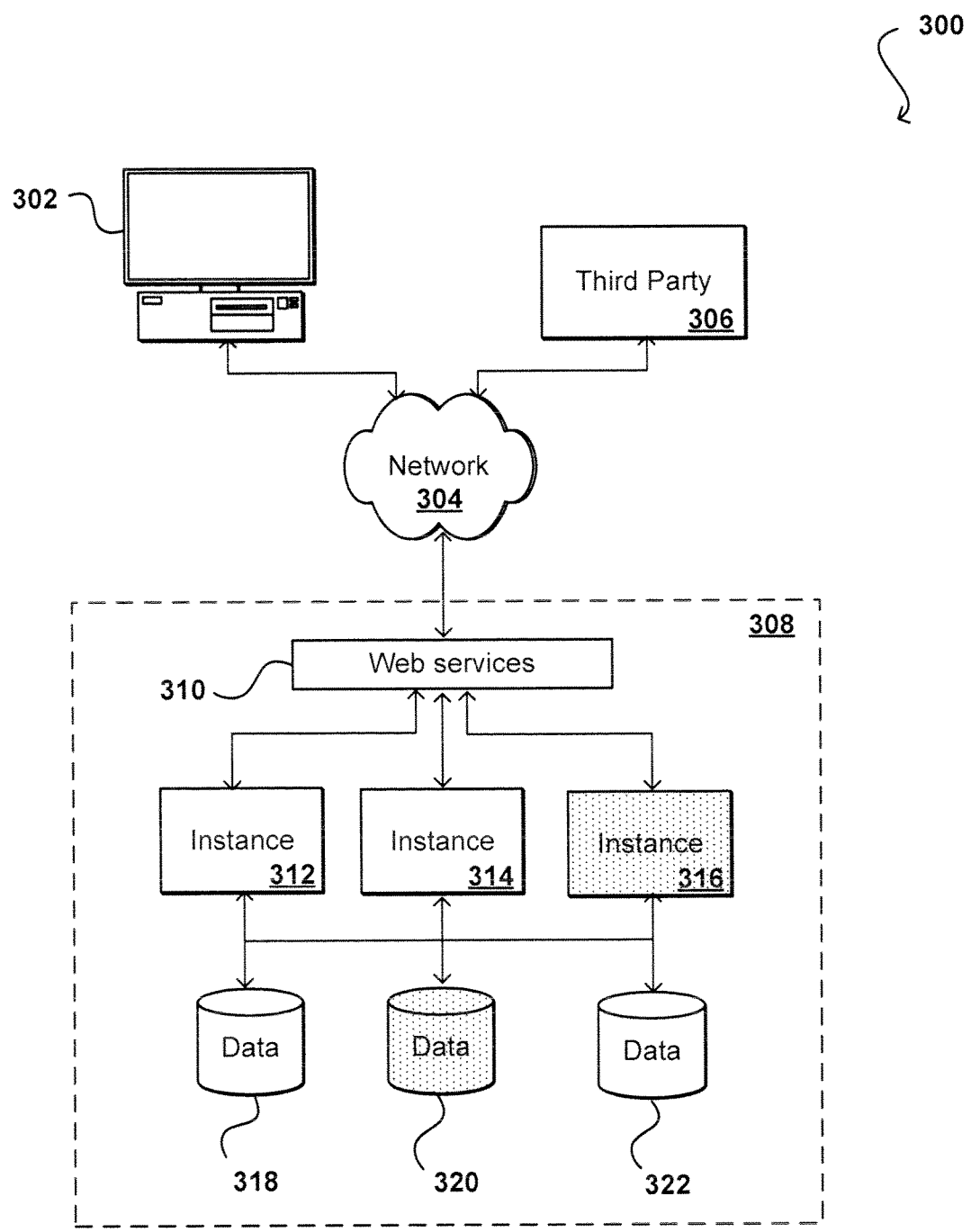
FIG. 3 illustrates a second example environment in which various embodiments can be implemented environment in which various embodiments can be implemented.

In some embodiments, data can be tagged or otherwise designated such that components can determine whether or not to access that data, in addition to, or independent of, any policies. For example, in FIG. 3 another example environment 300 is illustrated wherein a client device 302 and/or a third party system 306 are able to access a provider environment 308 over at least one network 304 to instantiate and/or utilize various resource instances 312, 314, 316. In this example, the instances have access to three data stores 318, 320, 322. One of the data stores 320 might be tagged as storing sensitive information (represented by the shading). One or more of the instances might have the ability to access data in that data store 320. In some embodiments, when an instance 316 reads data that is tagged with the sensitive tag, that instance then is also tagged with the sensitive tag (as evidenced by the shading). Once the instance 316 is tagged as having been exposed to the sensitive information, there can be limits in some embodiments on what that instance can do. For example, the instance might no longer be able to write data to either of the other data stores 318, 322 that do not contain sensitive data, as the instance could potentially store information that was generated using sensitive information. In some embodiments, the traffic from such an instance might instead be monitored to ensure that the instance does not transmit any of the tagged objects, or more than 100 bytes that match the object, among other such options. Various hashing or other such approaches can be used to monitor for such transmissions. In some embodiments, the instance might be able to transmit credit card numbers until the instance reads data tagged with a credit card tag, after which point the instance may no longer be able to transmit credit card data outside a designated boundary.

Further, the instance 316 might be prevented from sending information past the web services layer 310 to a client device or third party application 306, in order to prevent sensitive information from being sent outside the environment. In such a situation, an instance for a customer that has been exposed to sensitive information might have to be deleted and then replaced with a new instance in order to enable the customer to perform operations that cannot be performed by an instance that is tagged with a sensitive data tag, etc.

In some embodiments, an instance that has been exposed to tagged data can still perform certain operations with other components, but cannot perform certain operations that might appear as if they relate to the sensitive information. For example, there might be patterns to data objects marked with a "do not egress" or similar tag. A DLP process on the host of the instance, or at another appropriate location, can monitor data transferred from the instance to attempt to detect patterns that match either the patterns of the data objects or data that could be produced using those data objects. Thus, certain types of communication might be prevented when the instance has been exposed to protected resources and/or data.

In some embodiments, a resource such as a data store or queue might only be associated (e.g., "tainted") with a specific tag for messages or objects after a certain serial number or other such designation. For example, if 1,000 records are written before credit card data is written to a data store, then those 1,000 records might not be associated with a credit card tag (unless subsequently modified), but any data subsequently written to that data store might be associated with the credit card tag. In such a case, there might be multiple policies that apply to the data store, one for the data before the tainting and one for data after the tainting. In other embodiments, a new policy might be applied for the entire data store once any data in the data store is tainted with the tag.

Figure 4:
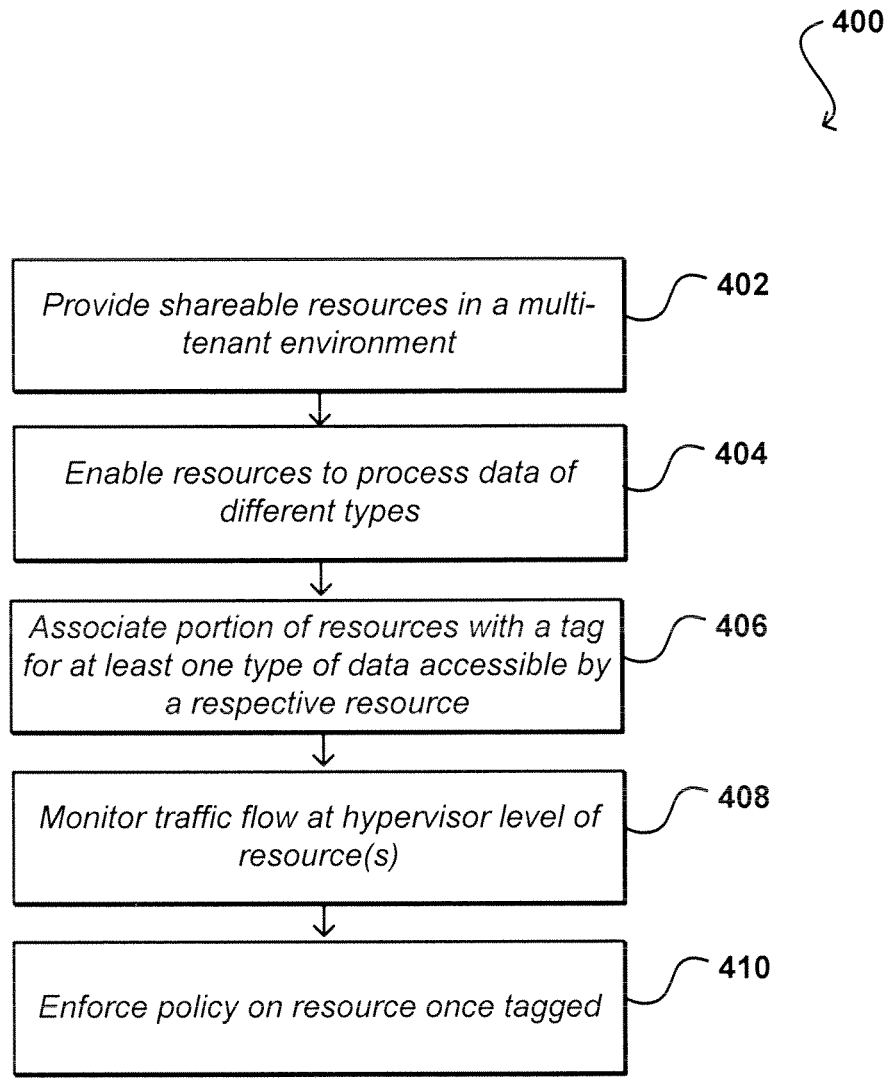
FIG. 4 illustrates an example process for controlling the use of data in a multi-tenant environment that can be utilized in accordance with various embodiments.

FIG. 4 illustrates an example process 400 for controlling the use of data in a multi-tenant environment that can be utilized in accordance with various embodiments. In this example, a set of shareable resources is provided 402 in a multi-tenant environment. Those resources cm be enabled 404 to process data of various types. In this example, a resource might be able to access data that has restrictions on what can be done with the data. For example, data associated with a specific tag might have a policy limiting use of the data. When a resource accesses a data object associated with such a tag, that tag can then be associated 406 with the resource. The tagging of the resource indicates that the resource has had access to a type of data, and now any applicable policies for the data type apply to the resource as well. The flow of traffic at one or more of the resources can be monitored 408 at the hypervisor, dom0, or a similar level. When traffic is received for a resource that has been associated with a data type tag, any applicable policy for that data type is enforced 410 to ensure that subsequent operation of the resource once exposed to that data type complies with usage restrictions for that data type. As discussed, enforcement can include blocking, alarming, or auditing, among other such options. In some cases, an application that does not want to be limited by the tag can cause an instance to be deleted and a new instance instantiated that has not had access to data of the data type, and thus is not associated with the tag.

As discussed, various configurations and rules can be established for different types of egress points in the environment, defining aspects such as the type of information that is able to pass through those egress points. As an example, credit card data stored in a credit card data store of a provider environment might only be able to be transmitted to a designated banking system, and not out over any other network interface or to any other destination. Such a rule can be implemented in a layer or set of components that have access to traffic entering and/or leaving a region of the environment, such that the rule can be enforced on any inspected traffic attempting to pass through. The traffic can be blocked, an alarm can be triggered, or another appropriate action can be taken when traffic contradicting at least one of the rules is detected. Since the environment can be a distributed, multi-tenant environment utilizing shared resources, the rules can be enforced utilizing a data loss prevention service, or other such entity, that is able to inspect traffic at any appropriate location in the environment and enforce rules at any appropriate location, such as at any appropriate customer compartment boundary. In some embodiments, the traffic is not inspected and/or rules enforced for traffic within the compartment boundary, but the traffic will be inspected before being transmitted beyond that boundary. Access to the security service can also be provided using one or more APIs as discussed and suggested elsewhere herein.

As discussed, a DLP module also can manage encryption for traffic in the environment. In at least some embodiments, traffic that is encrypted may not be allowed to pass certain customer boundary, or be directed to a location that is not also tagged with a certain security level. In some embodiments, encrypted traffic might be allowed if the location at which the traffic was encrypted corresponds to a trusted source. In still other embodiments, traffic can have a request for encryption that can then be performed at an appropriate location, such as at an egress boundary where the traffic is being scanned to ensure tagged information is not sent outside the boundary in violation of an egress policy. In addition, expected structures of the traffic can be enforced at any of these locations, which can make it more difficult to bypass a DLP module. In some embodiments, policies might be established that encryption can only be performed at a location in the system at which the traffic is able to be inspected.

In some embodiments, data loss prevention mechanisms can be implemented at multiple levels in a system or environment. Various multi-level security (MLS) approaches exist that permit access to certain levels or types of data based upon different security clearances, permissions, or other such criteria. A conventional MLS system might associate specific data stores, tables, or rows with security levels that a user must meet or exceed in order to access that data. Approaches in accordance with various embodiments can implement MLS-type functionality in the dom0, hypervisor, or other such location in various components of the multi-tenant environment. In some embodiments, data objects can be tagged as having a certain security or access level. The domU can be treated as operating at a single level, which can depend in at least some embodiments on the data that the domU has read. A component, application, or other such actor can be granted certain clearances, which can apply to certain security levels. When the actor attempts to access a resource or object in the environment, the clearance level of the actor can be compared to the clearance level of the resource or object, and the operation can fail if the two levels do not meet, or if the level of the actor does not match or exceed the level of the resource or object.

Enabling data objects, or resources to be tagged with a security level can help to control access to data in examples discussed above. For example, in FIG. 1 an instance 110 was able to access data in a data store 114 within a designated boundary region 120. Similar functionality could be provided by granting the data store 114 (or the data in the data store) a specific security level, and granting the instance 110 a security level that is at, or above, the level of the data store. Another instance 112 might have a security level that is below (or otherwise different from) the level of the data store 114 such film the instance 112 cannot read from the data store. Depending on the policies in place, the instance 112 might not be able to see the presence of data objects in the data store 114, or potentially even determine the existence of the data store. Various other policies can exist as well, such as where the instance 112 with a lower security level might be able to write to the data store 114, but cannot read data from the data store. Another data store 116 includes data with different security levels, such that the instance 112 can read data that has the same security level as the instance, but cannot read data with a higher (or otherwise more secure) level. Such an approach enables multiple security levels to be provided in the same system, using shared devices, without significant risk of unauthorized access to sensitive data.

In one example, a certain security level might be applied to anything that is able to store, access, or transmit credit card information or financial data. In order to access, receive, or transmit that data, a resource or resource instance may have to have at least the same security level, according to one or more policies. An application server or other such component can act as a trusted guard, ensuring that proper security credentials are provided before operations are allowed. In some embodiments, the trusted guard might allow any source, or certain types or levels of components, to write to resources with a certain security level, but not read data from those resources. Similarly, if a component attempts to write protected data to a location with a lower security level, the write can be denied.

In some embodiments, an environment can utilize compartments or boundaries with various security levels. There might be compartments that relate to types of data, and a hierarchical set of levels that correspond to the sensitivity of data within those compartments. For example, financial data might only be available to resources with a financial tag. Certain types of financial data might only be available to resources with a minimum security level. Thus, in order to access that data a resource must have the appropriate tag and at least the same security level. Having just the tag or the security level will not be sufficient in such an environment to be able to access the data. In some cases, a user or application may not be able to access data even when that user or application has a top security level, when that user or application is not tagged to have access, or granted permission to access, a certain compartment or boundary region.

Figure 5:
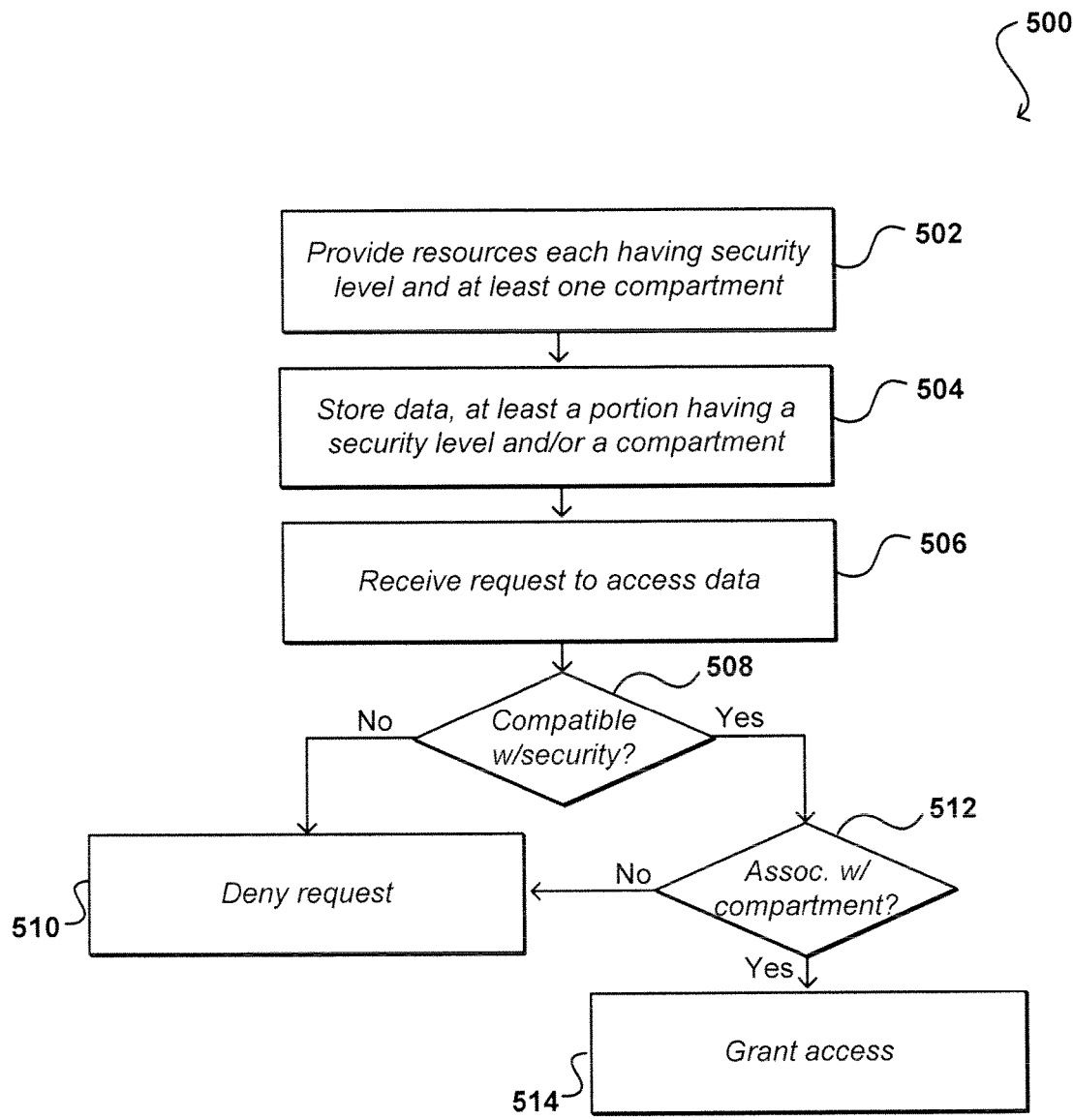
FIG. 5 illustrates an example process for enforcing multiple security levels in a multi-tenant environment that can be utilized in accordance with various embodiments.

FIG. 5 illustrates an example process 500 for enforcing multiple security levels in a multi-tenant environment that can be utilized in accordance with various embodiments. In this example, a set of resources is provided 502 in a multi-tenant environment, where each resource can have a specified security level and can be associated with one or more compartments. Data can be stored 504 in the multi-tenant environment, where at least a portion of that data is associated with a compartment and/or a security level. When a request for access to a data object is received 506, such as to the hypervisor of a resource, a determination can be made as to whether the security level of the resource making the request at least meets 508 any security level of the data to be accessed. If not, the request can be denied. A determination can also be made as to whether the resource making the request is associated 510 with any compartment of the data to be accessed. If not, the request can be denied. If the resource requesting access at least meets any security level and compartment restrictions of the data, the resource can be granted 514 access. In at least some embodiments, data might only have a security level or be associated with a compartment, while in other embodiments the data might be associated with multiple compartments. Further, in at least some embodiments the security levels are hierarchical and any resource or entity having higher than a security level associated with a data object can access the data object. In other embodiments, the security level might have to match in order for a resource to access a data object. Various other options can be used as well within the scope of the various embodiments.

In some embodiments, a component such as a queue of a messaging service, can have an associated set of metadata. For such a component, a classification of the queue can be stored to the metadata. In some embodiments, that queue can store any message with a level at or below the classification level of the queue. In some embodiments, various security groups can be established, and components such as a queue can be tagged with a tag for a respective security group. A queue also can be assigned to a compartment in some embodiments, or might be able to store messages from multiple compartments as long as those messages have an appropriate security level.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIGS. 1 and 2. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the on will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of managing access in a multi-tenant environment, comprising:
   receiving a request to access a resource in a multi-tenant environment, the request including security information corresponding to a requestor generating the request, and the resource having a security level associated with a policy;
   enforcing the policy, wherein the policy is used in determining at least one of access to the resource, use of the resource, or data transmission to or from the resource;
   determining whether the requestor has a security level that is compatible with the security level of the resource to be accessed;
   enabling access to the resource when the requestor has a security level that is compatible with the security level of the resource;
   detecting instructions to transmit data associated with the resource to a destination not associated with the security level of the resource;
   preventing transmission of the data to the destination based at least in part upon the policy associated with the security level of the resource;
   indicating the policy to the requestor;
   receiving an indication whether the requestor will enforce the policy; and
   sending updated security information to the requestor.

2. The computer-implemented method of claim 1, further comprising:
   sending updated security information to the requestor, wherein the updated security information specifies a different security level for the requestor as determined according to at least one security policy and based at least in part upon the access to the resource.

3. The computer-implemented method of claim 1, further comprising:
   updating security information for the resource when the access to the resource causes the security level of the resource to change according to at least one security policy.

4. The computer-implemented method of claim 1, further comprising:
   updating security information associated with the request, wherein an additional resource in the multi-tenant environment that receives the request will have an updated security level corresponding to the updated security information.

5. The computer-implemented method of claim 1, further comprising:
   negotiating with the requestor about the one or more policies when the requestor is outside the multi-tenant environment.

6. The computer-implemented method of claim 5, wherein the negotiating is performed at least in part by a hypervisor or a virtual private networking (VPN) component.

7. The computer implemented method of claim 1, wherein the resource includes first data associated with a first security tag, and further comprising:
   determining whether the security level of the requestor is compatible with the first security tag, the first security tag requiring a higher security level than the resource; and
   enabling access to the first data in the resource when the security level of the requestor is compatible with the first security tag.

8. The computer implemented method of claim 7, wherein the resource includes second data associated with a second security tag, and further comprising:
   determining whether the security level of the requestor is compatible with the second security tag; and
   denying access to the second data in the resource when the security level of the requestor is incompatible with the second security tag.

9. The computer implemented method of claim 7, further comprising:
   associating at least one security policy with the first security tag, the at least one security policy being selected from a set of security policies associated with a plurality of customers of the multi-tenant environment.

10. The computer implemented method of claim 1, further comprising:
    establishing a secure channel with the requestor before enabling access to the resource when the requestor is outside the multi-tenant environment.

11. A system for managing access in a multi-tenant environment, comprising:
    at least one server having at least one processor and a memory including instructions that, when executed by the at least one processor, cause the system to:
    receive a request to access a resource in a multi-tenant environment, the request including security information corresponding to a requestor generating the request, and the resource having a security level associated with a policy;

enforce the policy, wherein the policy is used in determining at least one of access to the resource, use of the resource, or data transmission to or from the resource;

determine whether the requestor has a security level that is compatible with the security level of the resource to be accessed;

enable access to the resource when the requestor has a security level that is compatible with the security level of the resource;

detect instructions to transmit data associated with the resource to a destination not associated with the security level of the resource; and prevent transmission of the data to the destination based at least in part upon the policy associated with the security level of the resource;

indicate the policy to the requestor;

receive an indication whether the requestor will enforce the policy; and send updated security information to the requestor.

12. The system of claim 11, wherein the instructions when executed further cause the system to:

send updated security information to the requestor, wherein the updated security information specifies a different security level for the requestor as determined according to at least one security policy and based at least in part upon the access to the resource.

13. The system of claim 11, wherein the instructions when executed further cause the system to:

update security information for the resource when the access to the resource causes the security level of the resource to change according to at least one security policy.

14. The system of claim 11, wherein the instructions when executed further cause the system to:

update security information associated with the request, wherein an additional resource in the multi-tenant environment that receives the request will have an updated security level corresponding to the updated security information.

15. The system of claim 11, wherein the instructions when executed further cause the system to:

negotiate with the requestor about the one or more policies when the requestor is outside the multi-tenant environment.

16. The system of claim 11, wherein the instructions when executed further cause the system to:

establish a secure channel with the requestor before enabling access to the resource when the requestor is outside the multi-tenant environment.

17. A non-transitory computer-readable storage medium including instructions that, when executed by at least one processor of a computing device, cause the computing device to:

receive a request to access a resource in a multi-tenant environment, the request including security information corresponding to a requestor generating the request, and the resource having a security level associated with a policy;

enforce the policy, wherein the policy is used in determining at least one of access to the resource, use of the resource, or data transmission to or from the resource;

determine whether the requestor has a security level that is compatible with the security level of the resource to be accessed;

enable access to the resource when the requestor has a security level that is compatible with the security level of the resource;

detect instructions to transmit data associated with the resource to a destination not associated with the security level of the resource;

prevent transmission of the data to the destination based at least in part upon the policy associated with the security level of the resource;

indicate the policy to the requestor;

receive an indication whether the requestor will enforce the policy; and send updated security information to the requestor.

18. The non-transitory computer-readable storage medium of claim 17, further comprising instructions, which when executed further cause the computing device to:

update security information for the resource when the access to the resource causes the security level of the resource to change according to at least one security policy.

19. The non-transitory computer-readable storage medium of claim 17, further comprising instructions, which when executed further cause the computing device to:

update security information associated with the request, wherein an additional resource in the multi-tenant environment that receives the request will have an updated security level corresponding to the updated security information.

20. The non-transitory computer-readable storage medium of claim 17, further comprising instructions, which when executed further cause the computing device to:

negotiate with requestor about the one or more policies when the requestor is outside the multi-tenant environment.

* * * * *